United States Patent

[11] 3,584,512

| | | |
|---|---|---|
| [72] | Inventors | Manfred Heiland Hahn;<br>Hatto Schneider, Heppenheim, both of, Germany |
| [21] | Appl. No. | 872,891 |
| [22] | Filed | Oct. 31, 1969 |
| [45] | Patented | June 15, 1971 |
| [73] | Assignee | Carl Schenck Maschinenfabrik G.m.b.H.<br>Daimstadt, Germany |
| [32] | Priority | July 25, 1969 |
| [33] | | Germany |
| [31] | | P 19 37 865.5 |

[54] BEARING STAND FOR BALANCING MACHINES
8 Claims, 3 Drawing Figs.

[52] U.S. Cl. .................................................. 73/475
[51] Int. Cl. .................................................. G01m 1/02
[50] Field of Search ...................................... 73/66, 459, 460, 471—479

[56] References Cited
UNITED STATES PATENTS
2,724,971  11/1955  Kroft et al. ..................... 73/462
2,751,262   6/1956  Federn et al. .................. 308/26

*Primary Examiner*—James J. Gill
*Assistant Examiner*—Herbert Goldstein
*Attorneys*—Curt M. Avery, Arthur E. Wilfond, Herbert L. Lerner and Daniel J. Tick ABSTRACT: Bearing stand for balancing machines including a bearing bridge having a main axis extending horizontally for supporting an object to be balanced so that its axis is horizontal and perpendicular to the main axis of the bearing bridge, a base for the stand, and three leaf springs extending in a row vertically from the stand base and carrying the bearing bridge at the upper ends thereof, the middle leaf spring being disposed in a vertical plane in which the horizontal axis of an object supported by the bearing bridge is disposed, and the end leaf springs being disposed in a vertical plane in which the main horizontal axis of the bearing bridge is disposed.

PATENTED JUN 15 1971  3,584,512

BEARING STAND FOR BALANCING MACHINES

Our invention relates to bearing stand for balancing machines supporting an object to be balanced having an axis extending in horizontal direction when the object is mounted in compound bearings.

It is advantageous in many cases, and even partly necessary, to balance motors or other fully assembled units in so-called compound bearings.

Accordingly, for example, a motor with its housing and bearings is screwed or bolted to the bearing bridges of a pair of bearing stands of a balancing machine. Both of the bearing bridges are thus firmly connected to one another through the housing of the motor. In the heretofore known compound bearings, the bearing bridges are flexibly supported at the base or foundation of the bearings. Such devices are not suited for the compound bearings in so-called hard balancing machines wherein the frames are adjusted according to the geometric dimensions. With such balancing machines, it is necessary that the bearing bridges be rigidly supported in the measuring direction and in vertical direction and that they be also adequately stiff in axial direction so as to be able to absorb free axial forces such as the thrust of a ventilator or blower impeller. To adjust the frame according to the geometric dimensions, the supporting points of the object being balanced must moreover be flexible or articulated on the bearing stands.

It is an object of our invention to provide bearing stands for balancing machines with compound bearings and frame adjustment according to the geometric dimensions at lowest possible production costs. It is moreover an object of our invention to provide such bearing stands which will afford rigidity and flexibility in appropriate directions so as to be able to adequately support so-called hard balancing machines.

With the foregoing and other objects in view, we provide bearing stand for balancing machines comprising a bearing bridge having a main axis extending in horizontal direction for supporting an object to be balanced so that its axis is horizontal and perpendicular to the main axis of the bearing bridge, a base for the stand, and three leaf springs extending in a row vertically from the stand base and carrying the bearing bridge at the upper ends thereof, the middle leaf spring being disposed in a vertical plane in which the horizontal axis of an object supported by the bearing bridge is disposed, and the end leaf springs being disposed in a vertical plane in which the main horizontal axis of the bearing bridge is disposed.

We thus proceed from the idea that practical requirements for joints that are elastically yieldable against torsion are adequately satisfied when the stiffness of the joints against torsion is relatively low with respect to the stiffness of support at the supporting points.

In accordance with another feature of our invention, we provide a bearing stand of one-piece construction, for example machined from a single piece of stock or cast in one piece.

Other features which are considered as characteristic for the invention are set forth in the appended claims.

Although the invention is illustrated and described herein as embodied in bearing stand for balancing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
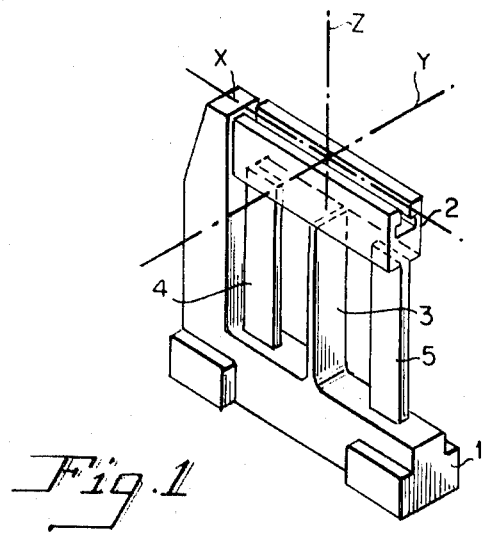
FIG. 1 is a perspective view of one embodiment of the bearing stand of our invention wherein the bearings bridge is flat.
Figure 2:
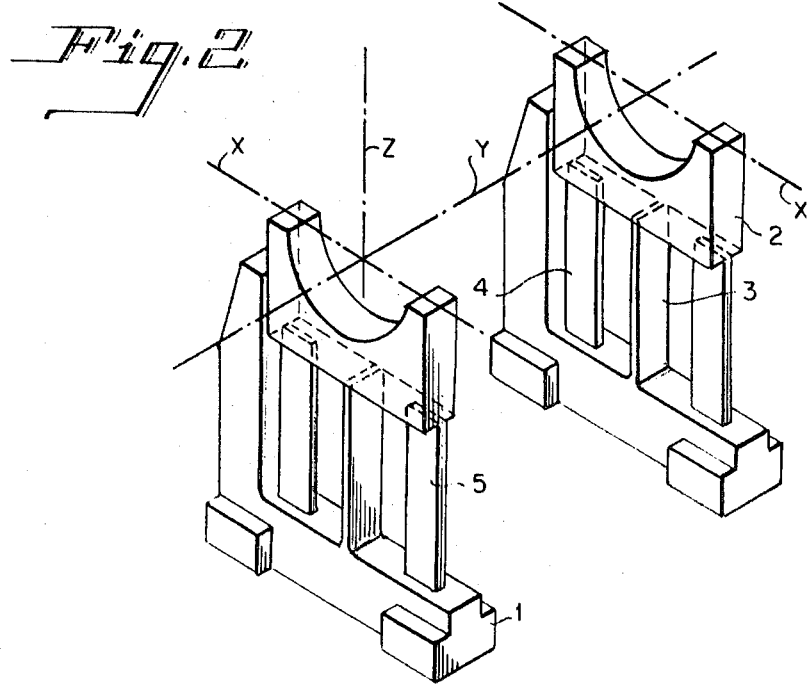
FIG. 2 is a perspective view of so-called compound bearings for a balancing machine including two aligned bearing stands that are different embodiments from that of FIG. 1 in that the bearing bridges thereof are saddle shaped.

Referring now to the drawings and first particularly to FIGS. 1 and 2 thereof, it is noted that the two embodiments of the bearing stand of our invention shown in those figures differ from one another only by the shape of their respective horizontally disposed bearing bridges 2. The specific alternate shape of the bearing bridges 2 is determined by the purpose for which the respective bearing stand is to be used. Whereas complete assemblies or the like having a flat underside can be secured on the bearing bridge embodiment of FIG. 1, the bearing bridge embodiment of FIG. 2 is equipped with a saddle bearing which is suited for receiving thereon cylindrically round members such as jet power plants or engines and the like or is capable of being used for receiving thereon rotors mounted on slide bearings wherein the slide bearings must be considered as being relatively fixed against rotation. By providing two stands, as shown in FIG. 2, a compound bearing is provided for supporting a cylindrical object that is to be balanced. Although not shown in the figures, the object being balanced is fastened to the bridges, for example with threaded bolts, tensioning devices or the like. In some cases however, for example when the object being balanced, such as individual rotors, are carried by the saddle bearings of FIG. 2, such fasteners can actually be dispensed with.

The bearing bridge 2 is supported on the base 1 of the bearing stand at the top of three vertically extending leaf springs 3, 4 and 5 that are disposed in a row. The middle leaf spring 3 is disposed in a vertical plane in which the horizontal axis Y of an object supported by the bearing stand or stands 2 is disposed. The leaf spring 3 is consequently very stiff and resistant to bending in the direction of the horizontal axis Y. However, in the X direction, perpendicular to the Y direction and constituting the measuring direction which extends in the horizontal direction of the bearing ridge 2, the leaf spring 3 is very flexible. The leaf spring 3, on the one hand, in the Z direction, which extends vertically perpendicularly to the X and Y directions, is unbendable when subjected to tension and compression, and on the other hand, is flexible when subjected to torsion about an axis extending in the Z direction.

Leaf springs 4 and 5 are located in a row at both sides, respectively, of the leaf spring 3. The flat surfaces of these end leaf springs 4 and 5 are disposed in a vertical plane in which the main horizontal axis X of the bearing bridge 2 is disposed. Consequently, the leaf springs 4 and 5 are stiff in the X direction and, in contrast thereto, are flexible in the Y direction when subjected to bending stresses. As in the case of the leaf spring 3, the leaf springs 4 and 5, on the one hand, are unbendable in the Z direction when subjected to tension or compression, and on the other hand, are flexible when subjected to torsion about an axis extending in the Z direction.

The bearing bridge 2 is thereby stiffened by three leaf springs 3, 4 and 5 against bending in the Z direction, by two leaf springs 4 and 5 against bending in the X direction and by one leaf spring 3 against bending in the Y direction, whereas it is flexibly supported to perform torsional or twisting movements about an axis extending in the Z direction.

Figure 3:
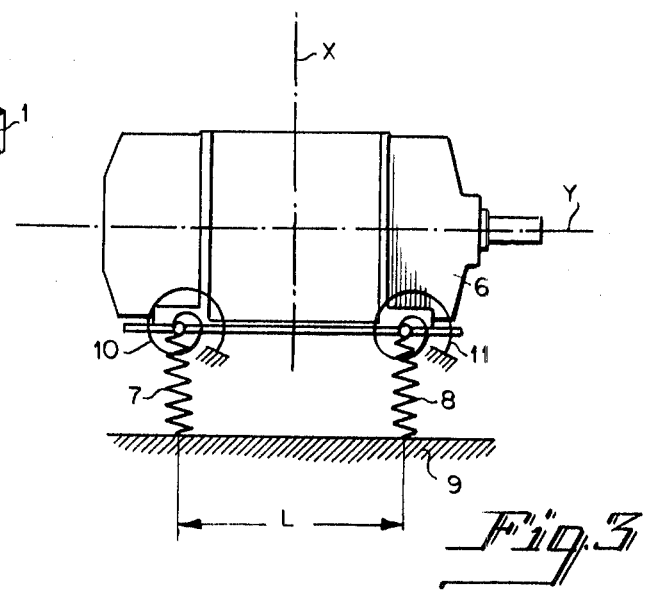
FIG. 3 is an equivalent diagram for a compound mounting utilizing bearing stands of our invention as viewed in top plan.

In a compound bearing, the bearing bridges of a pair of the bearing stands shown in FIGS. 1 and 2 are rigidly connected to one another through the housing 6 of an object to be balanced. The characteristics of the resulting assembly are clarified by the equivalent diagram shown in FIG. 3 wherein the housing 6 of an electric motor shown in plan view, is fixedly supported through a pair of helical springs 7 and 8 at a wall 9, the helical springs 7 and 8, when subjected to longitudinal stresses, having the stiffness of the leaf springs 4 and 5 stressed over the high edges thereof.

One end of the two helical springs 7 and 8, respectively, is immovable with the wall 9 and the other end thereof is connected to the housing 6 through swivel joints shown as spiral springs 10 and 11. The stiffness $C'$ of the spiral springs 10 and 11 against rotation or torsion can be represented as longitudinal stiffness at the supporting points. The value $C'/L^2$ consequently equals reduced stiffness wherein L is the distance of the supporting points from one another. In the case of conventional leaf springs suitable for supporting an object being balanced, a reduced stiffness results which is of adequately low value with respect to the supporting stiffness C of the helical springs 7 and 8. For rare exceptional cases where this condition does not appear to be readily fulfilled, a suitable dimensioning of the leaf springs or a corresponding minimal spacing of the supporting points is capable of being determined relatively easily by the use of this formula.

We claim:

1. Bearing stand for balancing machines comprising a bearing bridge having a main axis extending horizontally for supporting an object to be balanced so that its axis is horizontal and perpendicular to said main axis of said bearing bridge, a base for the stand, and three leaf springs extending in a row vertically from said base and carrying said bearing bridge at the upper ends thereof, the middle leaf spring being disposed in a vertical plane in which the horizontal axis of an object supported by said bearing bridge is disposed, and the end leaf springs being disposed in a vertical plane in which said main horizontal axis of said bearing bridge is disposed.

2. Bearing stand according to claim 1 comprising a rigid arm connected to said stand base and extending substantially vertically upward to said bearing bridge, said arm having an upper free end forming a firm support for means measuring unbalanced forces in direction of said main axis of said bearing bridge.

3. Bearing stand according to claim 1 wherein said bearing bridge is formed with a flat seating surface for the object to be balanced.

4. Bearing stand according to claim 1 wherein said bearing bridge is formed with a saddle-shaped seating surface for the object to be balanced.

5. Bearing stand according to claim 1 comprising a continuous one-piece structure.

6. Bearing stand according to claim 1 wherein said structure is formed of sheet metal.

7. Bearing stand according to claim 1 comprising a one-piece cast structure.

8. Compound bearing comprising a pair of bearing stands according to claim 1, said bearing stands being spaced from one another for supporting thereon opposite ends of an elongated object to be balanced.